United States Patent
Trott

(10) Patent No.: US 9,999,843 B2
(45) Date of Patent: Jun. 19, 2018

(54) OFFLINE FILTRATION DEVICE AND METHOD

(71) Applicant: Parker-Hannifin Corporation, Cleveland, OH (US)

(72) Inventor: John A. Trott, Saline, MI (US)

(73) Assignee: Parker-Hannifin Corporation, Cleveland, OH (US)

(*) Notice: Subject to any disclaimer, the term of this patent is extended or adjusted under 35 U.S.C. 154(b) by 938 days.

(21) Appl. No.: 14/276,422

(22) Filed: May 13, 2014

(65) Prior Publication Data

US 2015/0017020 A1 Jan. 15, 2015

Related U.S. Application Data

(60) Provisional application No. 61/844,921, filed on Jul. 11, 2013.

(51) Int. Cl.
*B01D 3/10* (2006.01)
*B01D 3/42* (2006.01)
(Continued)

(52) U.S. Cl.
CPC ............ *B01D 3/42* (2013.01); *B01D 3/10* (2013.01); *B01D 17/02* (2013.01); *B01D 17/12* (2013.01); *C10G 7/04* (2013.01); *C10G 33/08* (2013.01)

(58) Field of Classification Search
CPC ........ F04B 49/002; F04B 49/10; F04B 49/02; F04B 49/03; F04B 49/22; F04B 53/08;
(Continued)

(56) References Cited

U.S. PATENT DOCUMENTS 4,589,955 A * 5/1986 Nukala ............... B01D 35/185
196/114
4,649,736 A 3/1987 Austin
(Continued)

FOREIGN PATENT DOCUMENTS

DE 3432210 A1 3/1986
DE 3703525 A1 8/1988
(Continued)

OTHER PUBLICATIONS

International Search Report with Written Opinion, corresponding to application No. PCT/US12/064448, dated Feb. 15, 2013.
(Continued)

*Primary Examiner* — Joseph Drodge
(74) *Attorney, Agent, or Firm* — Renner Otto Boisselle and Sklar

(57) ABSTRACT

An apparatus, system and method are provided for controlling fluid flow through a vacuum chamber of a dehydration system, the vacuum chamber having a temperature sensing device operative to measure a temperature of a fluid in the vacuum chamber. A temperature difference between a temperature setpoint for the fluid and the measured temperature of the fluid is determined, and fluid is recirculated through the vacuum chamber while the temperature difference is greater than a predetermined temperature difference. While the temperature difference is less than the predetermined temperature difference, the fluid is recirculated through the vacuum chamber for a predetermined time period, and upon the predetermined time period expiring inhibiting recirculation of the fluid through the vacuum chamber.

19 Claims, 10 Drawing Sheets

(51) Int. Cl.
   *B01D 17/02*   (2006.01)
   *B01D 17/12*   (2006.01)
   *C10G 7/04*    (2006.01)
   *C10G 33/08*   (2006.01)

(58) Field of Classification Search
   CPC .............................. F04B 53/10; F04B 53/109;
                  F04B 2201/0601; F04B 2201/06011;
                  F04B 2201/06012; F04B 2205/10; F04B
                  2207/03; F04B 2207/043; B01D 3/42;
                  B01D 3/10; B01D 3/101; B01D 17/02;
                  B01D 17/12; B01D 21/30; B01D 21/302;
                  B01D 21/34; B01D 17/0214; B01D
                  17/0217; F16K 31/00; F16K 31/64; C10G
                  7/04; C10G 7/12; C10G 33/00; C10G
                  33/06; C10G 33/08; C10G 7/06
   USPC .... 210/86, 103, 104, 138, 143, 149, 167.01,
         210/167.02, 167.06, 175, 181, 194, 195.1,
                    210/257.1, 258; 137/2, 551, 563, 565.01,
                         137/565.11, 565.17, 565.19, 624.11,
                          137/624.12, 624.13, 624.15; 417/12, 14,
                          417/26, 27, 32, 36, 53, 279, 290, 292,
                              417/313; 196/46, 46.1; 208/187, 188;
                                                    159/44, 47.1, 901
   See application file for complete search history.

(56) References Cited

U.S. PATENT DOCUMENTS

| | | | |
|---|---|---|---|
| 4,757,618 A | 7/1988 | Mihalov | |
| 6,224,716 B1 | 5/2001 | Yoder | |
| 6,892,812 B2 * | 5/2005 | Niedermayr | E21B 44/00 |
| | | | 166/250.15 |
| 6,968,631 B1 | 11/2005 | Kuhn et al. | |
| 7,407,474 B2 | 8/2008 | Smith | |
| 8,060,259 B2 * | 11/2011 | Budhraja | H02J 3/008 |
| | | | 700/291 |
| 8,216,458 B2 * | 7/2012 | Scheel | F15B 21/041 |
| | | | 210/175 |
| 2004/0094460 A1 | 5/2004 | Herges et al. | |
| 2010/0219135 A1 * | 9/2010 | Priest | B01D 3/42 |
| | | | 210/744 |
| 2010/0281891 A1 | 11/2010 | Behrends et al. | |
| 2012/0080363 A1 | 4/2012 | Evanovich et al. | |

FOREIGN PATENT DOCUMENTS

| | | |
|---|---|---|
| GB | 2360953 A | 10/2001 |
| WO | 2006122560 A2 | 11/2006 |
| WO | 2013071105 A1 | 5/2013 |

OTHER PUBLICATIONS

Written Opinion of the International Preliminary Examining Authority, corresponding to application No. PCT/US12/064448, dated Oct. 31, 2013.

Vien Zhang, "High vacuum transformer oil dehydration system", www.oilfielddirectory.com, 1 page, Jun. 29, 2011.

Extended European Search Report for counterpart EP Application No. 14172780.0, dated Nov. 24, 2014.

* cited by examiner

OFFLINE FILTRATION DEVICE AND METHOD

RELATED APPLICATION DATA

This application claims the priority of U.S. Provisional Application No. 61/844,921, filed on Jul. 11, 2013, which is hereby incorporated by reference in its entirety.

FIELD OF THE INVENTION

The present invention relates generally to fluid dehydration, and more particularly to an apparatus and method for controlling vacuum dehydration of a fluid based on temperature.

BACKGROUND

Certain hydraulic systems include a tank or reservoir that receives and stores hydraulic fluid. These hydraulic systems often create pressures and vacuums within the tank or reservoir during use. Breather vents are typically provided in the tank to ensure that uncontaminated air is provided into the system and that the proper pressures are maintained for efficient and safe operation of the system.

For various reasons, water may find its way into the hydraulic fluid. For example, rain may leak into externally located reservoirs or seep through reservoir covers, access panels, breathers or worn seals. Additionally, condensation from air in reservoirs and other system areas can be a source for water contamination. Water can also enter the fluid system from the process side, from leaky heat exchangers or coolers, or direct ingression of process water, such as cooling water, washdown water or steam.

Water in hydraulic fluid is undesirable for a number of reasons. For example, water contamination can deplete some additives and react with others to form corrosive by-products which attack some metals. In addition, water contamination can reduce lubricant film-strength, which leaves critical surfaces vulnerable to wear and corrosion, as well as reduce filterability, increase air entrainment ability and increase the likelihood of cavitation.

Various methods exist for removing water from hydraulic fluid. One such method is vacuum dehydration, which uses purifiers to dry hydraulic fluids and lubricants by exposing them to a partial vacuum. Exemplary vacuum dehydration methods include flash distillation vacuum dehydration and mass transfer vacuum dehydration. While both processes utilize the concentration gradient between the fluid and the evacuated air to evaporate the water from the fluid, the flash distillation technology also applies heat to further boil off more water and operates at a higher vacuum. This makes flash distillation more rapid, as it removes more water from the fluid than a mass transfer device.

Conventionally, vacuum dehydration systems utilize a moisture sensor to determine a moisture level in the fluid and thus to determine when dehydration is complete. A problem with using moisture sensors, however, is that they tend to have slow response times (particularly when the fluid is above saturation), which can lead to less than optimal control of the dehydration process.

SUMMARY OF INVENTION

The present disclosure provides an apparatus, system and method for dehydrating hydraulic fluid based on fluid inlet conditions at a dehydration chamber. Preferably, the inlet conditions are based on temperature data of the fluid as determined from a temperature sensor.

In accordance with the present disclosure, an effective flow rate of the fluid being dehydrated is regulated based on temperature. An advantage of using temperature to determine the effective flow rate is more efficient use of heat energy. Further, regulating effective flow based on temperature in accordance with the present disclosure does not require the entire fluid reservoir to be heated and maintained a predetermined temperature, thus allowing operation of the system over a wider range of temperatures. As used herein, the term "predetermined" refers to values, setpoints, levels, etc. that are determined in advance and fixedly set within the controller, and values, setpoints, levels, etc. that can be dynamically changed, for example, based on operator input and/or calculations performed by an algorithm executed by a controller or the like.

According to one aspect of the disclosure, a controller for controlling fluid flow through a vacuum chamber of a dehydration system is provided, the vacuum chamber having a temperature sensing device operative to measure a temperature of a fluid in the vacuum chamber. The controller includes: a processor and memory; logic stored in memory and executable by the processor, the logic including, logic configured to determine a temperature difference between a temperature setpoint for the fluid and the measured temperature of the fluid; logic configured to cause the fluid to recirculate through the vacuum chamber while the temperature difference is greater than a predetermined temperature difference; and logic configured to cause the fluid to recirculate through the vacuum chamber for a predetermined time period while the temperature difference is less than the predetermined temperature difference, and upon the predetermined time period expiring while the temperature difference is less than the predetermined temperature difference, logic configured to inhibit recirculation of the fluid through the vacuum chamber.

According to one aspect of the disclosure, the system includes an inlet valve having a first state that inhibits fluid flow from a fluid reservoir into the vacuum chamber and a second state that enables fluid flow from the fluid reservoir into the vacuum chamber, and the controller further includes: an input for receiving the first state or the second state of the inlet valve; and logic configured to initialize a timer upon the inlet valve transitioning from the first state to the second state, the timer operative to keep time of the interval in which the fluid is recirculated through the vacuum chamber while the temperature difference is less than the predetermined temperature difference.

According to one aspect of the disclosure, the controller includes logic configured to automatically monitor, at predetermined intervals, a moisture level of a fluid sample; and logic configured to automatically initiate, upon the moisture level exceeding a predetermined moisture level, dehydration of the fluid.

According to one aspect of the disclosure, the logic configured to automatically monitor the moisture level includes: logic configured to cause a vacuum to be applied to the chamber to draw fluid into the chamber; and logic configured to measure the moisture level of the fluid drawn into the chamber.

According to one aspect of the disclosure, the controller includes: logic configured to determine a fluid level within the vacuum chamber; and logic configured to inhibit recirculation of fluid through the vacuum chamber when the fluid level in the vacuum chamber is below a predetermined fluid level.

According to one aspect of the disclosure, the dehydration system includes a recirculation valve arranged between a fluid inlet of the vacuum chamber and a fluid outlet of the vacuum chamber, the recirculation valve having a first state that inhibits recirculation of the fluid through the vacuum chamber, and a second state that enables recirculation of the fluid through the vacuum chamber, wherein the logic configured to cause the fluid to recirculate includes logic that places the recirculation valve in the second state.

According to one aspect of the disclosure, the logic that inhibits recirculation includes logic that places the recirculation valve in the first state.

According to one aspect of the disclosure, a system for dehydrating a fluid includes: the controller described herein; and the vacuum chamber including an inlet having an inlet valve for moving the fluid into the vacuum chamber, an outlet having a recirculation valve for recirculating the fluid through the vacuum chamber, and a temperature sensor for measuring a temperature of the fluid in the vacuum chamber, the controller operatively coupled to the inlet valve, the recirculation valve and the temperature sensor.

According to one aspect of the disclosure, the system includes: a dehydration device arranged in the vacuum chamber and operative to facilitate dehydration of the fluid; and a heater arranged in the vacuum chamber, the heater operative to heat the fluid to a predetermined temperature.

According to one aspect of the disclosure, the system includes a moisture sensor operative to detect a moisture level of fluid entering the inlet.

According to one aspect of the disclosure, the system includes a fluid level sensor assembly configured to determine a maximum fluid level and a minimum fluid level in the vacuum chamber.

According to one aspect of the disclosure, the system includes a fluid pump operative to recirculate the fluid between the inlet and the outlet.

According to one aspect of the disclosure, a method of controlling fluid flow through a vacuum chamber of a dehydration system is provided, the vacuum chamber having a temperature sensing device operative to measure a temperature of a fluid in the vacuum chamber. The method includes: determining a temperature difference between a temperature setpoint for the fluid and the measured temperature of the fluid; recirculating fluid through the vacuum chamber while the temperature difference is greater than a predetermined temperature difference; and while the temperature difference is less than the predetermined temperature difference, recirculating the fluid through the vacuum chamber for a predetermined time period, and upon the predetermined time period expiring inhibiting recirculation of the fluid through the vacuum chamber.

According to one aspect of the disclosure, the system includes an inlet valve having a first state that inhibits fluid flow from a fluid reservoir into the vacuum chamber and a second state that enables fluid flow from the fluid reservoir into the vacuum chamber, the method further including initializing a timer upon the inlet valve transitioning from the first state to the second state, the timer keeping time of the interval in which the fluid is recirculated through the vacuum chamber while the temperature difference is less than the predetermined temperature difference.

According to one aspect of the disclosure, the method includes: at predetermined intervals, automatically monitoring a moisture level of a fluid sample; and upon the moisture level exceeding a predetermined moisture level, automatically initiating dehydration of the fluid.

According to one aspect of the disclosure, automatically monitoring the moisture level includes: applying a vacuum to the chamber to draw fluid into the chamber; and measuring the moisture level of the fluid drawn into the chamber.

According to one aspect of the disclosure, measuring the moisture level comprises using a moisture detector to measure the moisture level in the fluid.

According to one aspect of the disclosure, the method includes determining a fluid level within the vacuum chamber, and disabling recirculation of fluid through the vacuum chamber when the fluid level in the vacuum chamber is below a predetermined fluid level.

According to one aspect of the disclosure, the dehydration system includes a recirculation valve arranged between a fluid inlet of the vacuum chamber and a fluid outlet of the vacuum chamber, the recirculation valve having a first state that inhibits recirculation of the fluid through the vacuum chamber, and a second state that enables recirculation of the fluid through the vacuum chamber, wherein recirculating the fluid includes placing the recirculation valve in the second state.

According to one aspect of the disclosure, inhibiting recirculation includes placing the recirculation valve in the first state.

The foregoing and other features of the invention are hereinafter described in greater detail with reference to the accompanying drawings.

DETAILED DESCRIPTION

Figure 1:
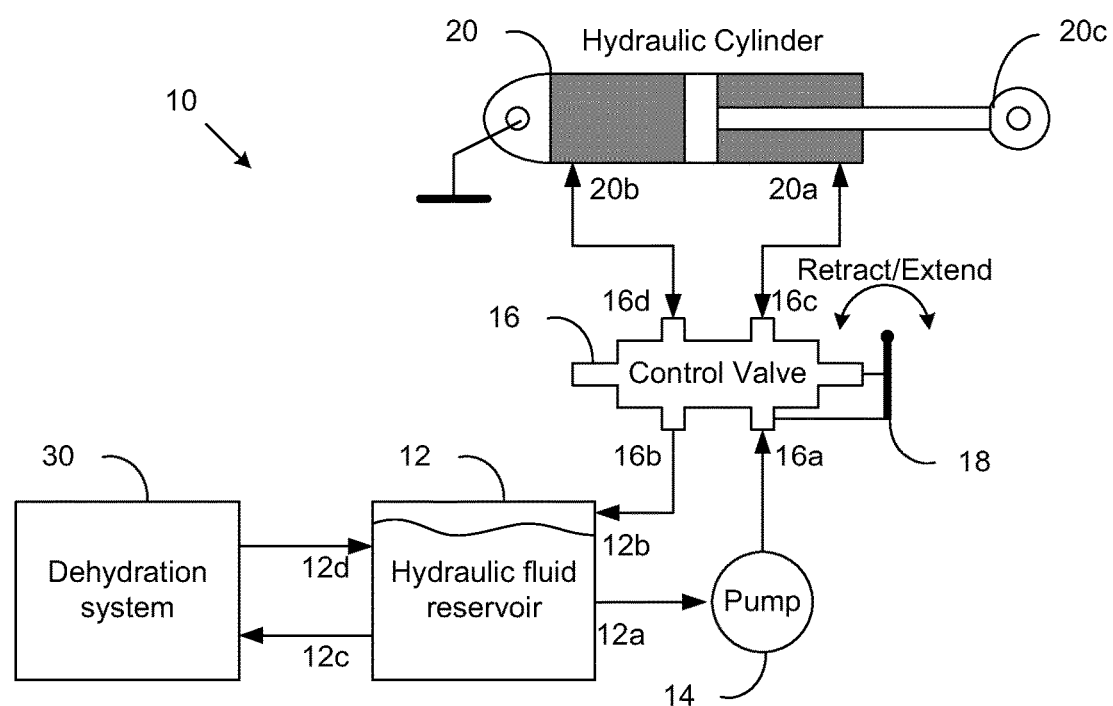
FIG. 1 illustrates an exemplary hydraulic system including a dehydration system.

Referring now to the drawings in detail, and initially to FIG. 1, an exemplary hydraulic system is indicated generally by reference numeral 10. The hydraulic system 10 includes a hydraulic reservoir 12, which stores hydraulic fluid that is used to power hydraulic devices. As is known, hydraulic reservoirs hold excess hydraulic fluid to accommodate volume changes due to, for example, cylinder extension and contraction, temperature driven expansion and contraction, and leaks. As will be appreciated by one having ordinary skill in the art, the reservoir 12 may be sized to meet the requirements of the specific application.

The reservoir 12 includes a system outlet 12a, which provides the hydraulic fluid to a pump 14 for pressurization, a system inlet 12b for return of the hydraulic fluid to the reservoir, a dehydration system outlet 12c for providing hydraulic fluid to a dehydration system, and a dehydration system inlet 12d for receiving dehydrated fluid from the dehydration system. The pump 14, which is coupled to the system outlet 12a, pressurizes the hydraulic fluid as is conventional. In the exemplary hydraulic system 10, the pump 14 is a gear pump, although other types of pumps (e.g., piston pumps, vane pumps, etc.) may be used depending on the requirements of the specific application.

The pressurized fluid then is provided to control valve 16, which includes a plurality of hydraulic connections. For example, the control valve 16 can include a high pressure inlet 16a for receiving pressurized fluid from the pump 14, an outlet 16b for returning the fluid to the reservoir 12, and first and second control ports 16c and 16d for coupling to a hydraulic device 20, e.g., a hydraulic cylinder, a hydraulic motor, etc. In the system shown in FIG. 1, the control port 16c is coupled to a front side 20a of hydraulic cylinder 20, and control port 16d is coupled to a backside 20b of hydraulic cylinder 20. By varying the pressurized fluid between the front side 20a and back side 20b of the cylinder 20, linear motion can be achieved.

For example, the control valve 16 may be a spool (not shown) inside a cast iron or steel housing. The spool slides to different positions in the housing such that intersecting grooves and channels route the fluid based on the spool's position. Operation of the spool may be accomplished, for example, via manual operation of a lever 18 coupled to the spool, or via an automatic or semiautomatic actuator (e.g., a motor, solenoids, etc., not shown).

In the exemplary system 10 shown in FIG. 1, when the lever 18 is placed in a first position (e.g., to the left), the high-pressure fluid provided by the pump 14 is routed to control port 16c (which is coupled to the front side 20a of the cylinder 20), and the system inlet 12b of the reservoir 12 is coupled to the control port 16d (which is coupled to the back side 20b of the cylinder 20). In this manner, the front side 20a of hydraulic cylinder 20 will fill with pressurized fluid, while the backside 20b of hydraulic cylinder 20 (which is not under pressure) will expel fluid from the cylinder and back to the reservoir 12 via control port 16d. The net result of the process is movement of the cylinder arm 20c toward the left in FIG. 1 (i.e., the length between ends of the cylinder decreases). Conversely, when the lever 18 is placed in a second position (e.g., to the right) the pump 14 is coupled to control port 16d and the system inlet 12b is coupled to the control port 16c. This results in the back side 20b of hydraulic cylinder 20 filling with pressurized fluid via control port 16d, while the front side 20a of hydraulic cylinder 20 will expel the fluid back to the reservoir 12 via control port 16c. The net result is the cylinder arm 20c will move to the right in FIG. 1 (i.e., the length between ends of the cylinder increases).

While only a single pump, control valve and actuator are shown in FIG. 1, it should be appreciated that there could be any number of pumps, control valves and actuators in the hydraulic system 10. Illustration of only a single pump, control valve and actuator is for sake of clarity.

Through normal use, environmental issues, maintenance, etc., the hydraulic fluid within the system 10 may become contaminated with water. To remove the water from the fluid, a dehydration system 30 is coupled to the reservoir 12. As will be described in more detail below, a portion of the hydraulic fluid in the reservoir 12 is provided to the dehydration system 30 for dehydration via the dehydration system outlet 12c, at least some of the moisture is removed from the portion of hydraulic fluid by the dehydration system 30, and the portion is returned to the reservoir 12 via the dehydration system inlet 12d. Such process repeats until the water level in the hydraulic fluid reaches a desired setpoint.

Figure 2:
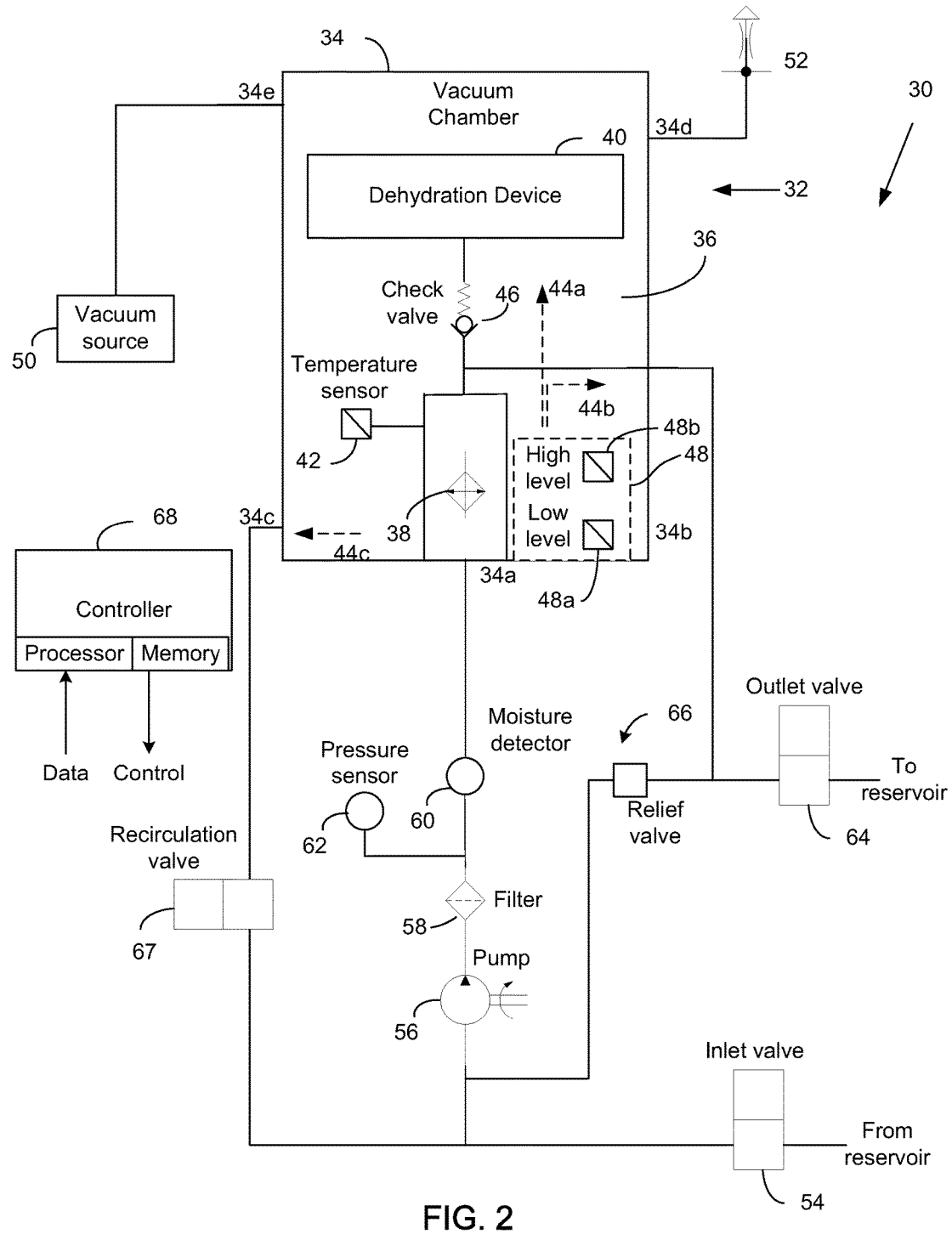
FIG. 2 is a schematic diagram illustrating an exemplary dehydration system in accordance with the present disclosure.

Referring now to FIG. 2, an exemplary dehydration system, which is referenced generally by the numeral 30, is illustrated. The dehydration system 30 includes a vacuum chamber assembly 32, and generally includes a housing 34 that defines a vacuum chamber 36. Within the vacuum chamber 36 are a heater 38 and a dehydration device 40. As used herein, the term dehydration device is a device that increases the surface area of the fluid that is exposed to the vacuum. Exemplary dehydration devices include a diffuser, coalesce, nozzle, fins, or the like. As will be described in more detail below, the housing 34 includes an inlet 34a for providing hydraulic fluid into the vacuum chamber 36, a first outlet 34b for returning the dehydrated fluid to the reservoir 12, a second outlet 34c for recirculating the fluid through the chamber 36, a vent line 34d for controlling the vacuum within the chamber 36, and a vacuum line 34e for receiving a vacuum signal to create a vacuum in the chamber 36. Also included in the vacuum chamber 36 is a temperature sensor 42, which measures a temperature of the fluid within the chamber 36.

A first flow path 44a within the chamber includes the inlet 34a, surrounds at least a portion of the heater 38, and passes through the dehydration device 40, such as a diffuser. In one embodiment, a tubular structure surrounds the heater 38 and forms part of the first flow path. As fluid enters the chamber 36 via the first flow path 44a, the fluid passes through the tubular structure, is heated by the heater 38 passes through check valve 46 and then is provided to the dehydration device 40, which removes water from the fluid. After passing through the dehydration device 40, the fluid accumulates in a bottom region of the chamber 36. A second flow path 44b in the chamber includes the inlet 34a, the heater 38 and the first outlet 34b. The second flow path 44b is utilized when the dehydrated fluid is pumped back to the reservoir (the check valve 46 providing the return pressure). Finally, a third flow path 44c in the chamber includes the second outlet 34c, which provides a path by which the fluid is removed from the chamber and recirculated back into the chamber.

Figure 3:
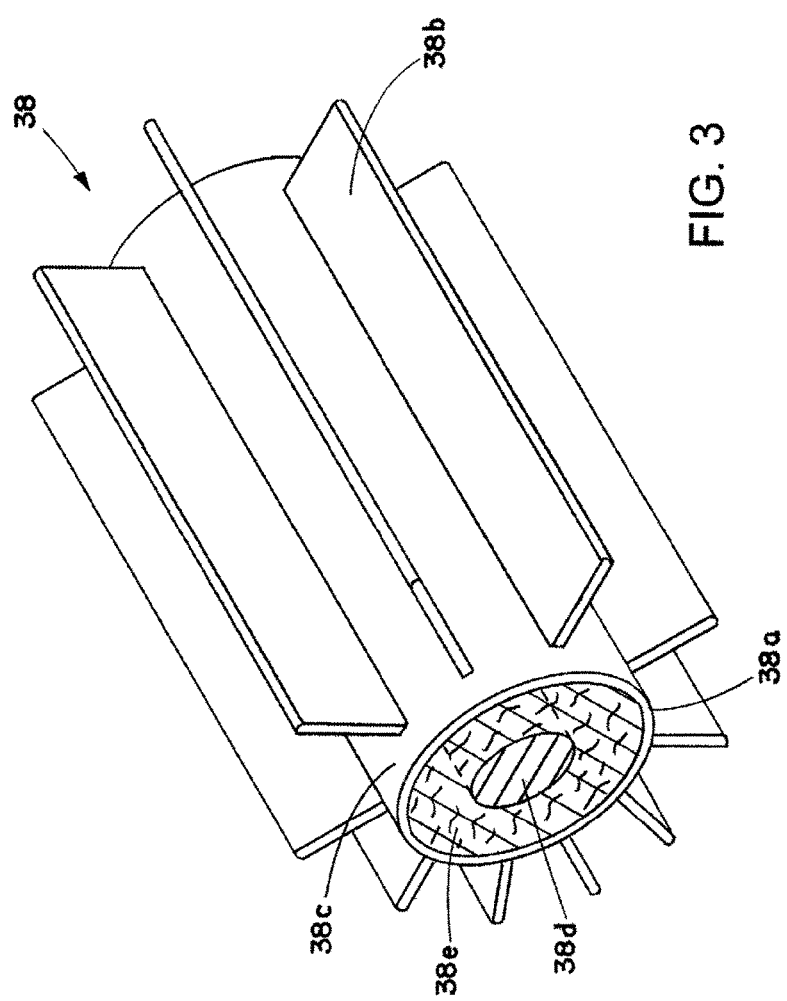
FIG. 3 is a schematic diagram illustrating an exemplary heater that may be used in the vacuum chamber assembly in accordance with the present disclosure.

Preferably, the heater 38 is configured to prevent the generation of hot spots on a surface that contacts the fluid. Briefly referring to FIG. 3, in one embodiment the heater 38 is a finned structure formed from a core 38a having a defined inner volume with a plurality of fins 38b extending from an outer surface 38c of the core. The core and fins can be formed from a heat-conductive material, such as aluminum, copper or the like. Arranged within the core 38a is a heating element 38d, such as an electric heating element or the like, and a packing material 38e, such as sand, fibers or other granular material, occupies the volume in the core between an inner wall of the core and an outer surface of the heating element. By packing the heating element within a packing material, hot spots on a surface of the heater 38 can be minimized or even eliminated.

Moving back to FIG. 2, a check valve 46 may be arranged within the first flow path 44a prior to the dehydration device 40. The check valve 46 prevents a fluid flow through the dehydration device 40 when vacuum is removed from the chamber 36 (i.e., during return of the fluid to the reservoir 12) and makes return flow of the possible.

Arranged within the chamber 36 is a fluid level sensor assembly 48 for measuring the fluid level within the chamber. The fluid level sensor assembly includes a low level sensor 48a for detecting when the fluid level is at or near a minimum level in the chamber 36, and a high level sensor 48b for detecting when the fluid level is at or near a maximum level in the chamber 36. As will be discussed in more detail below, the fluid level sensor assembly 48 is used in the sequencing of the dehydration system 30.

By heating the fluid within the vacuum chamber 36, the efficiency of the dehydration process is significantly increased compared to systems that do not use heat or systems that externally heat the fluid. Energy efficiency gains have been found to be significant, with results showing that at 50 percent power input the vacuum chamber assembly 32 provides only a 5-10% reduction in water removal relative to conventional systems operating at 100 percent power. Such reduction in power provides a significant reduction in operating cost of the dehydration system.

A vacuum source 50 creates a vacuum signal, which is coupled to the vacuum line 34e of the vacuum chamber assembly 32. Further, a vent 52 having a variable opening is coupled to the vent line 34d of the vacuum chamber assembly 32. By controlling the variable opening of the vent 52 in conjunction with the vacuum provided at the vacuum line 34e, a vacuum is created in the vacuum chamber 36.

In one embodiment, the vacuum source 50 is a vacuum pump. In another embodiment, the vacuum source is a compressor and venturi system, where compressed air is expelled through a venturi coupled to the vacuum line 34e. An advantage of the compressor/venturi system is that it tends to be more reliable than a vacuum pump. However, the vacuum pump tends to be more efficient that a venturi system.

An inlet valve 54 receives fluid from the reservoir 12 for dehydration. More specifically, a first end of the inlet valve 54 is coupled to the dehydration system outlet 12c of the reservoir 12, and a second end of the inlet valve 54 is coupled to an inlet of a pump 56, which is driven by a motor (not shown). Pump 56, for example, may be a gear pump, a piston pump, a vane pump, or any other pump that may be used to move hydraulic fluid. The output of the pump 56 is provided to a filter 58, which removes contaminants from the fluid as is conventional, and then to a moisture detector 60 which determines an amount of moisture in the fluid. The moisture detector 60 may be a conventional moisture detector that, for example, detects relative humidity. An output of the moisture detector 60 is coupled to the inlet 34a of the vacuum chamber assembly 32, while a pressure sensor 62 monitors a pressure of the fluid provided to the vacuum chamber assembly 32.

An outlet valve 64 provides the fluid back to the reservoir 12. More specifically, a first end of the outlet valve 64 is coupled to the dehydration system inlet 12d of the reservoir 12, and a second end of the outlet valve 64 is coupled to the first outlet 34b of the vacuum chamber assembly 32. In addition, a pressure relief valve 66 is coupled between the second end of the outlet valve 64 and the second end of the inlet valve 54. The pressure relief valve 64 is a safety device that detects when a pressure in the system exceeds a predetermined level, and opens to relieve the pressure.

A recirculation valve 67 controls recirculation of the fluid through the vacuum chamber 36. More specifically, a first end of the recirculation valve 67 is coupled to the vacuum chamber outlet 34c, and a second end of the recirculation valve 67 is coupled to the hydraulic pump 56, the inlet valve 54 and pressure relieve valve 66.

A controller 68, such as a programmable logic controller (PLC), computer system including a processor and memory, or the like, is operatively coupled to the respective components of the system. For sake of clarity, connections to the individual components are not shown. It is to be understood, however, that the controller 68 receives pressure data from the pressure sensor 62, moisture data from the moisture sensor 60, temperature data from the temperature sensor 42, fluid level data from the fluid level assembly 48, and/or data from other sensors that may be utilized in the system 30. Such data may be in analog or digital form, discrete data, etc. as is conventional. In addition, the controller 68 provides control signals to the inlet, outlet and recirculation valves 54, 64 and 67 to independently open and close the respective valves, turn on and off the pump 56, turn on and off the vacuum source 50, control the vent 52, control the heater 38, and/or other devices that may be used to control the system 30.

With continued reference to FIG. 2, operation of the dehydration system 30 will now be described. Initially, the controller 68 places the vacuum source to the ON state, and changes the flow through the vent 52 (e.g., by changing the size of an orifice in the vent 52) to provide a desired vacuum level within the chamber 36. As a result, a vacuum is created in the chamber 36. In addition, the controller 68 places the outlet valve 64 and the recirculation valve 67 in the CLOSED state, the inlet valve 54 in the OPEN state (i.e., a second state in which fluid flow from the reservoir 12 to the vacuum chamber 36 is enabled), and the pump 56 in the OFF state. Due to the vacuum created in the chamber 36, the hydraulic fluid in the reservoir 12 is drawn through the inlet valve 54, the pump 56, filter 58, and through the moisture detector 60. The moisture detector 60 detects an initial reading of the moisture content within the hydraulic fluid, and provides the reading to the controller 68.

The fluid continues past the moisture detector 60 and enters the vacuum chamber assembly 32 via inlet 34a, where the fluid is heated by heater 38. The heat energy provided by the heater 38 is regulated by the controller 68 based on a temperature reading as obtained from the temperature sensor 42. Such regulation may be performed, for example, using a "proportional-integral-derivative" (PID) controller as is conventional.

The heated fluid then passes through the check valve 46 and through the dehydration device 40, where the fluid is exposed to the vacuum within the chamber 36. By exposing the hydraulic fluid to the vacuum, water within the fluid evaporates and is carried out of the chamber 36, thereby leaving the "dried" fluid behind. The dried fluid accumulates in the chamber until a high fluid level is detected by the high level switch 48b.

Upon the fluid reaching a high level in the chamber 36, a recirculation step begins. More specifically, the controller 68 places the inlet valve 54 in the CLOSED state (i.e., a first state in which fluid flow from the reservoir 12 to the vacuum chamber 36 is inhibited), and places the pump in the ON state. The outlet valve remains in the CLOSED state, vacuum is maintained in the chamber 36 and heat is applied to the fluid. The pump 56 pulls the fluid from the chamber 36 via the second outlet 34, and moves the fluid back through the filter 58, moisture detector 60, heater 38 and dehydration device 40 to remove additional water from the fluid. Pressure in the system is monitored by the controller 68 via pressure sensor 62 to ensure fluid pressure is within an expected range and, if an out of range condition is present, appropriate action is taken. The recirculation process continues until the moisture level in the fluid reaches a predetermined target level.

In determining the target level for the moisture in the fluid, a step approach can be implemented. More specifically, each batch of fluid provided to the system 30 is dehydrated by a predetermined amount (i.e., a step), and then returned to the reservoir 12.

For example, if it is desired to reduce the water content in the fluid by X percent, then each batch process may reduce the water content by X/10. More specifically, if fluid entering the dehydration system is at 100 percent saturation and the end goal is to have 1 percent saturation, the fluid is not recirculated through the chamber 36 until the 1 percent saturation target is reached. Instead, the fluid may be recirculated until it is at 90 percent saturation, and then returned to the reservoir 12. The next batch then is processed in a similar manner, and the process continues until the saturation level in the fluid reaches the 1 percent target level.

In determining the "step" for each batch, the controller 68 analyzes the moisture content in the fluid relative to a moisture curve, which approaches an asymptote, and determines the most efficient step. For example, the step may be a balance between the time it takes to heat the process fluid volume and the water removal efficiency. For optimum water removal efficiency it is preferable to stay as close to the moisture curve as possible. However, for optimum energy efficiency it is preferable to have a larger step (which results in not being as close to the curve as possible). In one embodiment, the step is programmed to be a 15% drop in relative humidity on the y axis of the moisture curve.

In order to more precisely determine the optimum step, the step can be based on the inlet temperature of the fluid, the system volume of fluid, and mode setting, where the mode setting is temporary use or continuous use. When the unit is in temporary mode the step level is disregarded the system follows the water removal curve as closely as possible.

Upon the moisture level in the fluid reaching the target value, the controller places the vacuum source in the OFF state, opens the vent 52 thereby venting the chamber 36 (i.e., vacuum is removed or at least minimized, thereby closing the check valve 46), closes the recirculation valve 67, and opens the outlet valve 64. The pump remains in the ON state, and due to the closed check valve 46 in combination with the open outlet valve 64, the fluid in the chamber 36 is pumped back into the reservoir 12.

By venting the vacuum (e.g., opening the vent 52 to minimize or remove any vacuum in the chamber 36) before discharge, the fluid can be pumped out of the chamber 36 without the pump 56 "opposing" the vacuum. This enables the pump 56 to operate as both a recirculation pump and a discharge pump. Moreover, the size of the pump can be reduced, as the pump does not need to overcome the vacuum in the chamber. In contrast, if the vacuum remained in the chamber 36 during discharge of the fluid, the pump and motor would need to be sized not only to pump the fluid out of the chamber and back to the reservoir 12, but also to overcome the vacuum in the chamber 36. Further, such operation would cause cavitation of the fluid.

Figure 4:
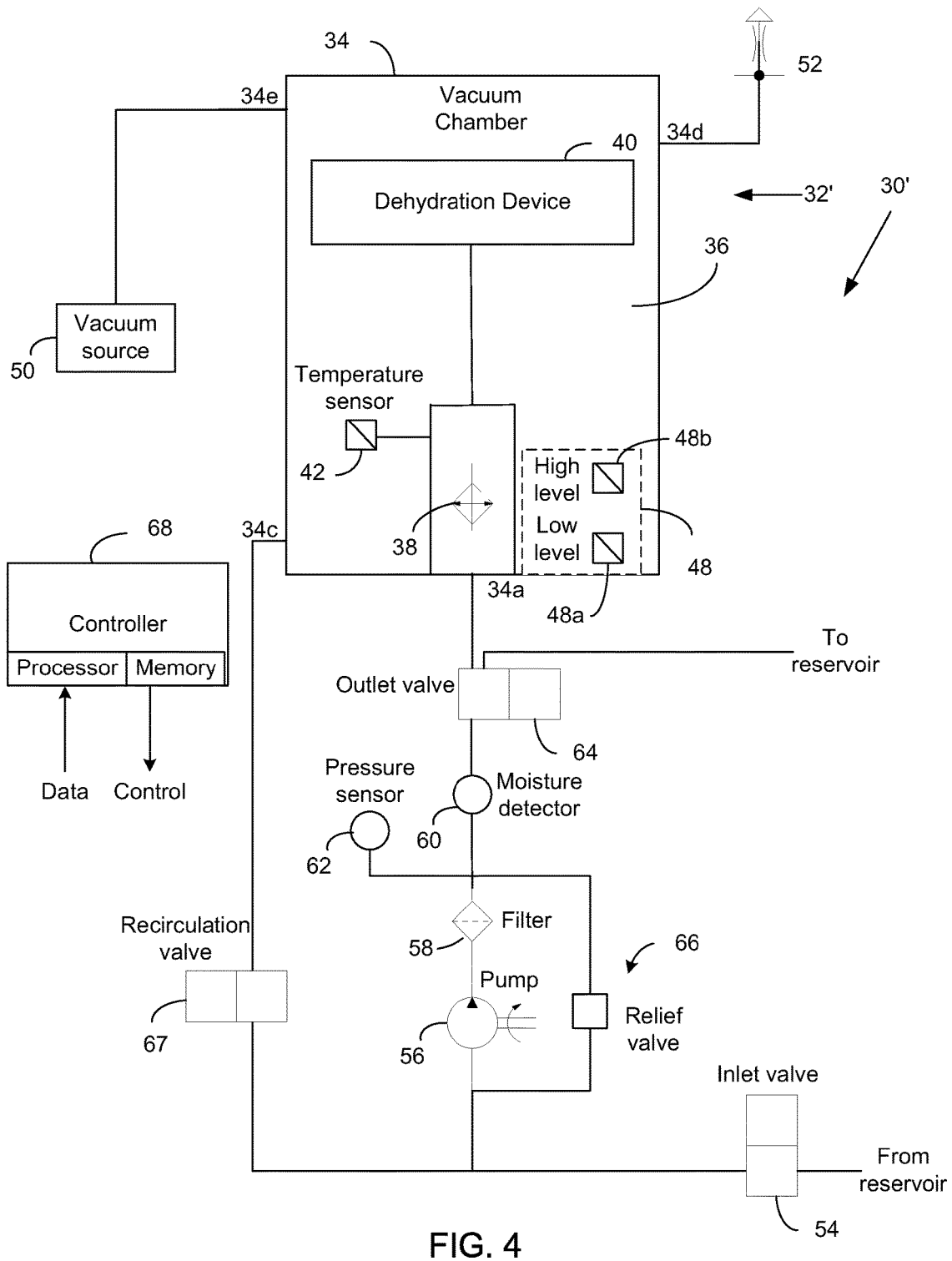
FIG. 4 is a schematic diagram illustrating another exemplary dehydration system in accordance with the present disclosure.

Moving to FIG. 4, another embodiment of a dehydration system 30' in accordance with the disclosure is illustrated. The embodiment shown in FIG. 4 has many features in common with the embodiment shown in FIG. 2, which was discussed above. Therefore, only the differences between the two embodiments are discussed below.

Addressing first the vacuum chamber assembly 32', the check valve between the heater 38 and the dehydration device 40 in the embodiment of FIG. 4 has been removed in the embodiment of FIG. 4, and a direct connection between the heater and dehydration device 40 has been inserted in place of the check valve. In addition, the first outlet 34a in the embodiment of FIG. 2 and corresponding connection to the outlet valve 64 has been removed from the embodiment of FIG. 4. Removal of the check valve and first outlet from the vacuum chamber assembly 32 simplifies construction of the assembly, reduces costs, and allows for full pump pressure during return of the fluid to the reservoir.

Moving now to the circuit feeding fluid to the vacuum chamber assembly 32, the outlet valve 64 is arranged between the moisture detector 60 and the inlet 34a of the vacuum chamber assembly 32. More particularly, a first end of the outlet valve 64 is coupled to the moisture detector 60, a second end of the outlet valve 64 is coupled to the inlet 34a, and a third end of the outlet valve 64 is coupled to the dehydration system inlet 12d of the reservoir 12.

Operation of the outlet valve is as follows. In the CLOSED state, the first end of the outlet valve 64 is coupled to the second end of the outlet valve, and the third end of the outlet valve is isolated form the first and second end. Thus, in the CLOSED state fluid is provided to the vacuum chamber assembly 32. In the OPEN state, the first end of the outlet valve 64 is coupled to the third end of the outlet valve, and the second end of the outlet valve is isolated form the first and third end. Thus, in the OPEN state fluid is provided to the reservoir 12.

Control of the embodiment shown in FIG. 4 is the same as the embodiment shown in FIG. 2 and thus will not be discussed.

Figure 5:
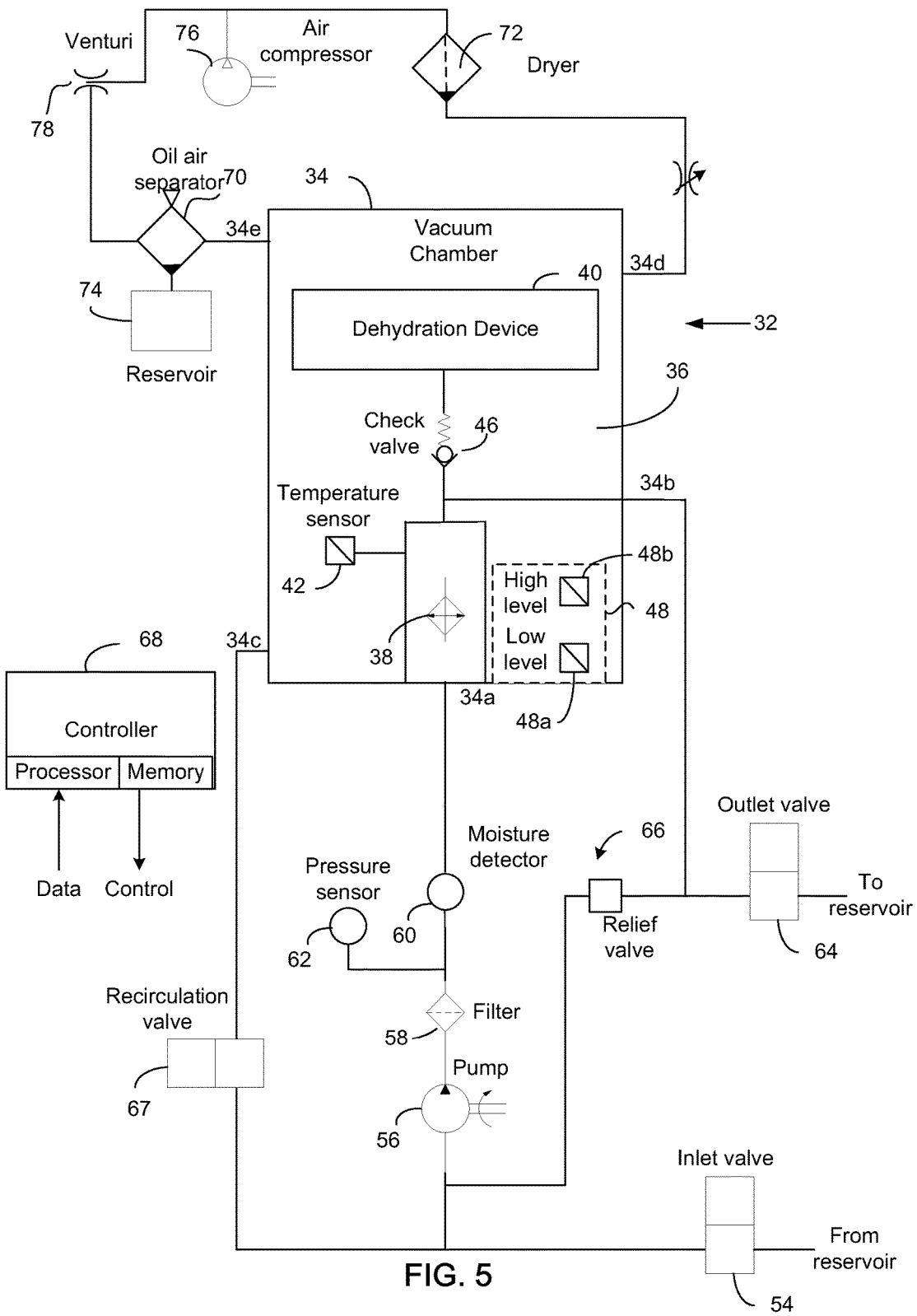
FIG. 5 is a schematic diagram illustrating yet another exemplary dehydration system in accordance with the present disclosure.

Moving now to FIG. 5, another embodiment of the dehydration system 30 in accordance with the disclosure is illustrated. Other than the means by which the vacuum is generated in the vacuum chamber 34, the embodiment of FIG. 5 is the same as the embodiment of FIG. 2, and control of the system is essentially the same between the respective embodiments. Therefore, only the differences between the two embodiments are discussed below.

In the embodiments shown in FIGS. 2 and 4, the vacuum is created via a vacuum pump or the like. In the embodiment shown in FIG. 5, however, the vacuum is generated using venturi system. More specifically, the vacuum line 34e is connected to an oil-air separator 70, the vent line 34d is connected to a dryer 72, and a reservoir 74 may be provided to collect oil and/or water removed by the oil-air separator 70 and dryer 72. In addition, a compressor 76 provides a compressed air source that is expelled through a venturi 78, thereby creating a pressure differential. Respective ends of the dryers 70, 72 are coupled to the venturi, and the pressure differential creates a vacuum as the air is discharged from the compressor through the venture 78. As noted above, the venturi system is advantageous in that it requires less maintenance when compared to a vacuum pump system.

With additional reference to FIGS. 6-10, illustrated are logical operations to implement an exemplary method dehydrating a fluid in accordance with the present disclosure. The logical operations of FIGS. 6-10 may be executed by the controller 68. Thus, the flow charts of FIG. 6-10 may be thought of as depicting steps of a method carried out by the controller 68 of the dehydration system 30-30''. Although FIGS. 6-10 show a specific order of executing functional logic blocks, the order of executing the blocks may be changed relative to the order shown. Also, two or more blocks shown in succession may be executed concurrently or with partial concurrence. Certain blocks also may be omitted. In addition, any number of functions, logical operations, commands, state variables, semaphores or messages may be added to the logical flow for purposes of enhanced utility, accounting, performance, measurement, troubleshooting, and the like. It is understood that all such variations are within the scope of the present disclosure.

Supervisory Control Function

Figure 6:
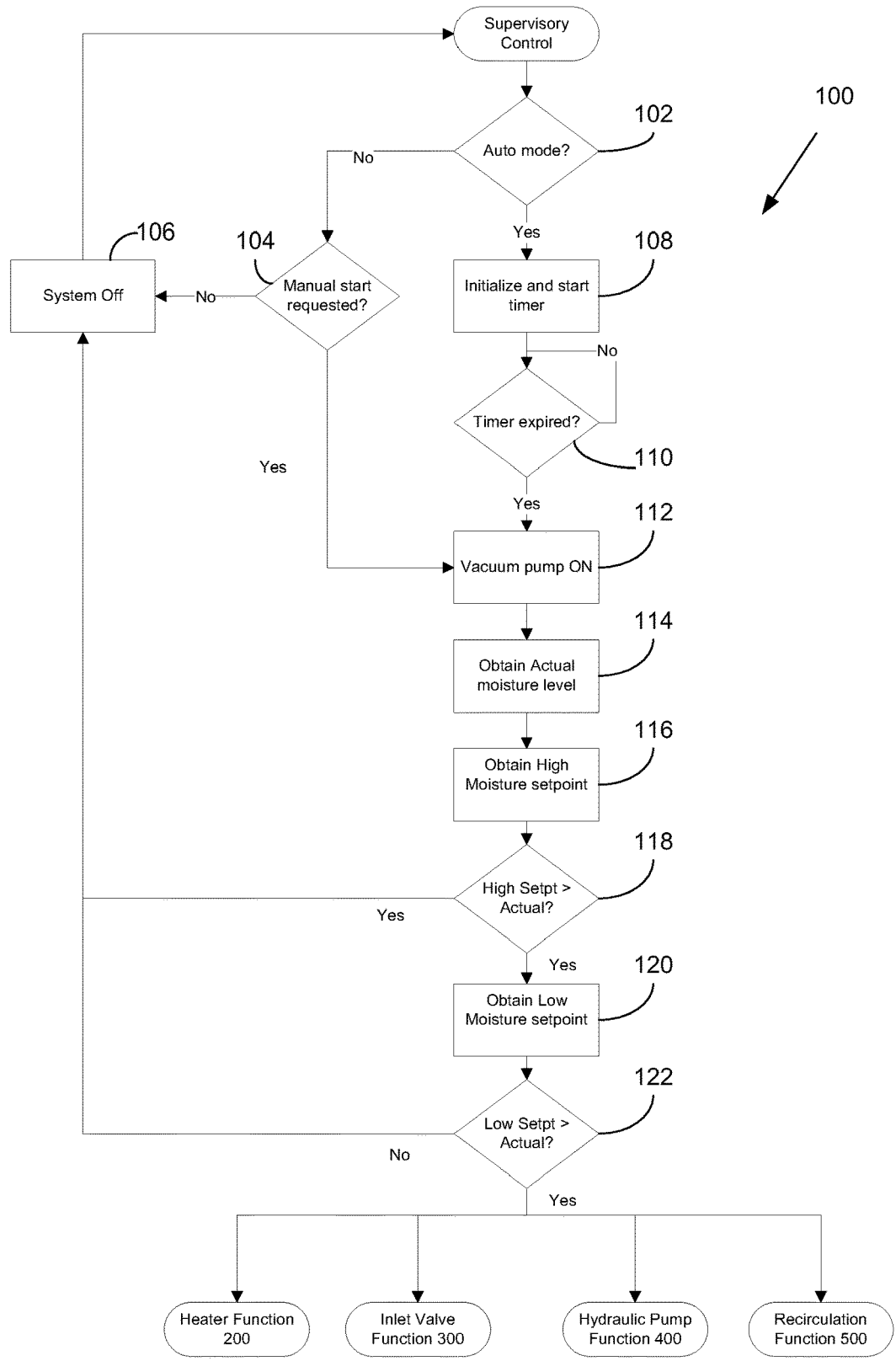
FIG. 6 is a flow chart illustrating supervisory control of a dehydration system in accordance with the present disclosure.
Figure 7:
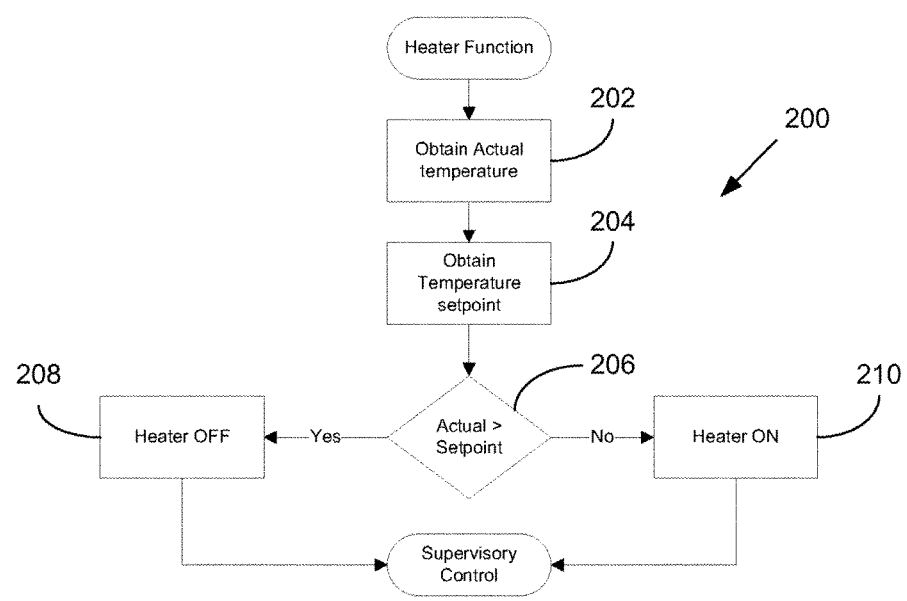
FIG. 7 is a flow chart illustrating heater control within a dehydration system in accordance with the present disclosure.
Figure 8:
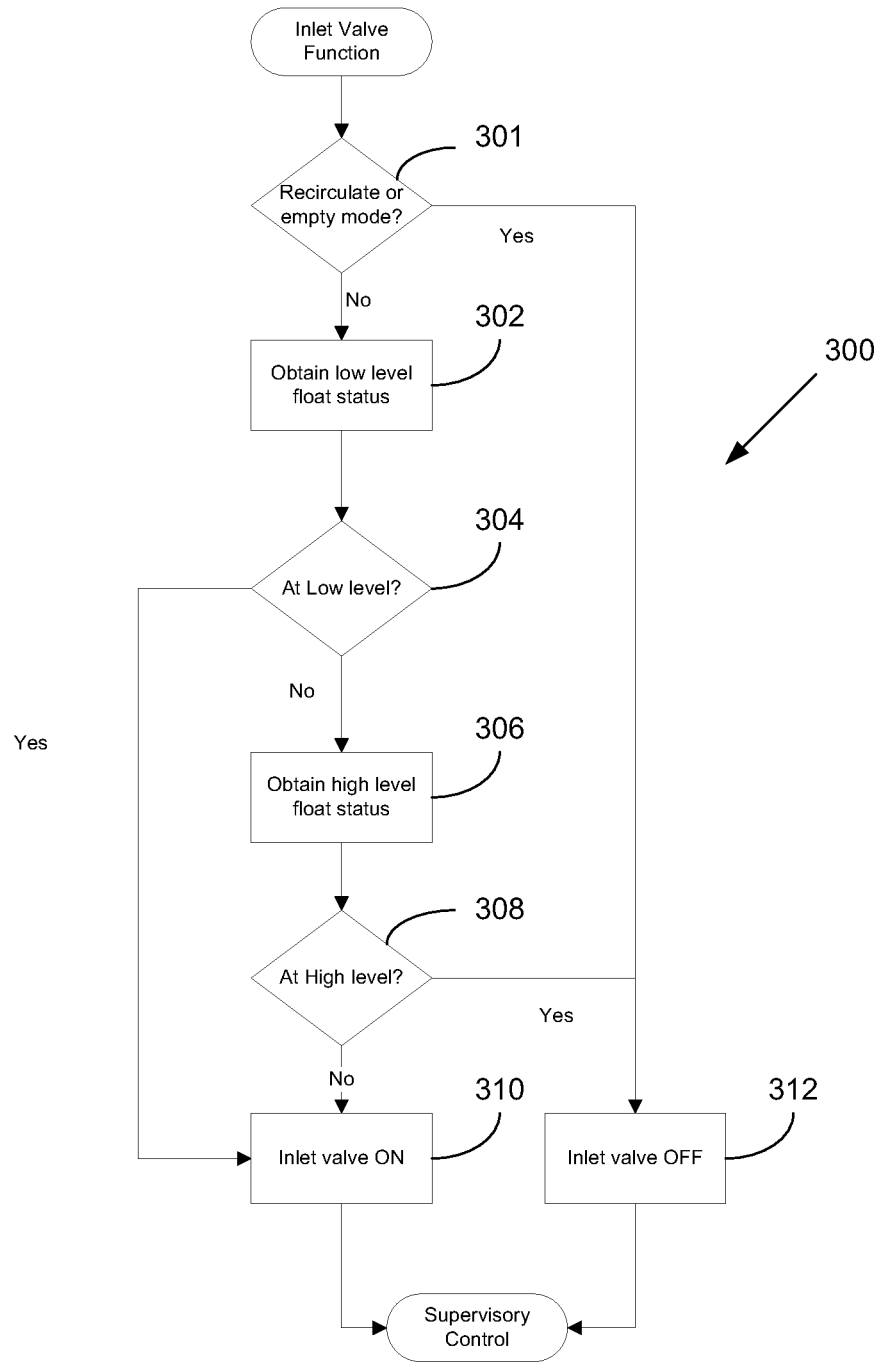
FIG. 8 is a flow chart illustrating inlet valve control for a dehydration system in accordance with the present disclosure.
Figure 9:
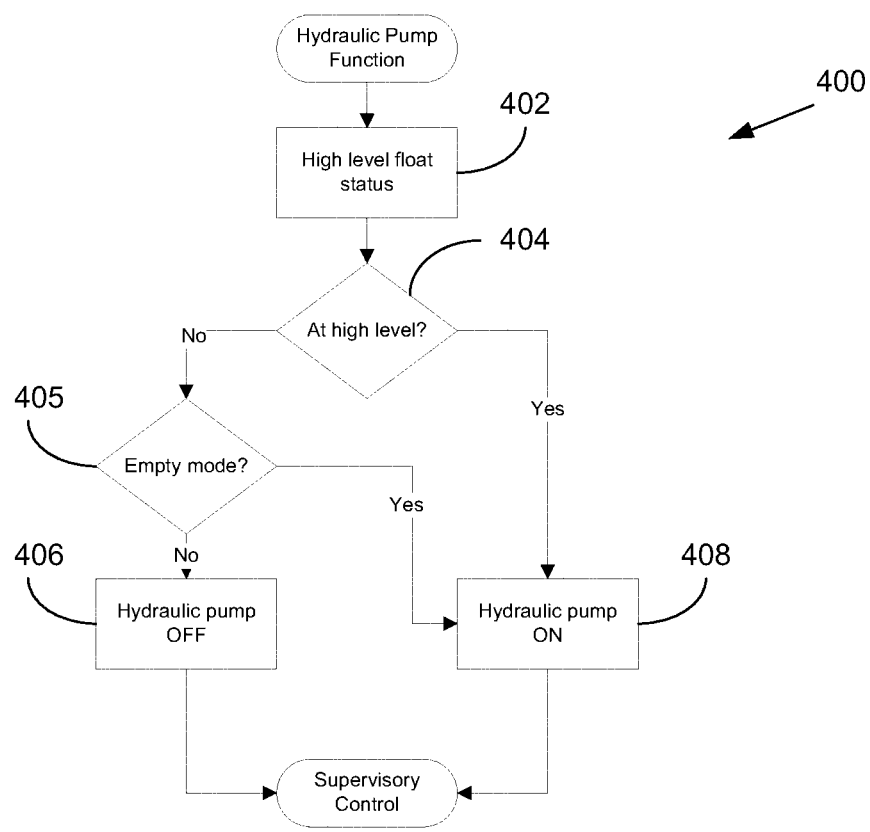
FIG. 9 is a flow chart illustrating hydraulic pump control for a dehydration system in accordance with the present disclosure.

FIG. 6 illustrates logical operations corresponding to supervisory control of the dehydration system. Briefly, supervisory control of the system determines when dehydration of the fluid is performed. Such determination may be automatically performed, or based on a user request. Upon performing dehydration of the fluid, the supervisory control calls a number of functions as discussed in more detail below.

Beginning at block 102, a determination is made with respect to the operational mode of the dehydration system 30. Possible modes include, for example, automatic mode and manual mode. In automatic mode, the system periodically measures the moisture level in the hydraulic fluid. If the measured moisture level exceeds a first predetermined moisture level (high level), the system will automatically run until the moisture level in the hydraulic fluid is reduced to a second predetermined moisture level (low level). Upon reaching the second predetermined moisture level, the system will stop all subsystems, and return to periodic monitoring of the moisture level.

In manual mode, the system operates based on a user instruction to run (e.g., a manual start request). Upon receiving a manual start request, the system will remove the moisture in the fluid (provided the moisture level exceeds the first predetermined moisture level), and continue until the moisture level is reduced to the second predetermined moisture level. Once the moisture level is reduced to the second predetermined moisture level, the system stops and takes no further action.

It should be appreciated that the above discussion of auto and manual mode is merely exemplary, and variations of the respective modes may be implemented without departing from the scope of the invention. For example, it may be desired that in manual mode the system performs a dehydration operation even if the moisture level in the fluid is less than the first predetermined threshold. More specifically, the system may be configured such that if the moisture level in the fluid is 70% saturated, the first setpoint is 80% saturation, and the second setpoint is 20% saturation, a manual start will dehydrate the fluid until there is 20% saturation, even though the moisture in the fluid is less than 80% saturation.

Continuing with block 102, if the system is not in auto mode (i.e., the system is in manual mode), then at block 104 it is determined if a manual start has been requested. A manual start may be requested, for example, by a user pressing a manual start pushbutton. If a manual start has not been requested, then the method moves to block 106 and all systems are shut down. Specifically, the vacuum source 50, heater function 200, inlet valve control function 300, hydraulic pump function 400 and recirculation control function 500 are all disabled. It is understood that the act of disabling the functions 200, 300, 400 and 500 also disables heater 38, closes the inlet valve 54, disables the hydraulic pump 56 and closes the recirculation valve 67, respectively. The method then loops back to block 102 and the process repeats.

Moving back to block 104, if a manual start has been requested, then the method moves to block 112 and the vacuum source 50 is enabled, thereby creating a vacuum in the vacuum chamber 36. The vacuum draws fluid into the chamber via the inlet 34a, and as the fluid is drawn into the chamber 36 the moisture in the fluid is measured by moisture detector 60 as indicated at block 114. At block 116 a high moisture setpoint (the first predetermined moisture level) is obtained for comparison with the measured moisture in the fluid. As will be appreciated, the high moisture setpoint used for the system is application-specific, and can be any value based on the specific needs of the system being dehydrated. In one embodiment the high moisture setpoint is between 70% saturated and 80% saturated. The high moisture setpoint may be a user-adjustable setpoint (e.g., modifiable via a user interface) or it may be a fixed value (e.g., stored in memory of the controller 68).

At block 118 the high moisture setpoint is compared to the measured moisture in the fluid. If the high moisture setpoint is greater than the measured moisture, then dehydration is not necessary and the system moves to block 106 and disables all subsystems (the vacuum source 50, heater function 200, inlet valve control function 300, hydraulic pump function 400 and recirculation control function 500 are disabled). However, if at block 118 the high moisture setpoint is not greater than the measured moisture level, then at block 120 the low moisture setpoint (the second predetermined moisture level) is obtained. At block 122 the low moisture setpoint is compared to the measured moisture in the fluid. If the low moisture setpoint is not greater than the measured moisture, then dehydration is complete or not necessary and the system moves to block 106 and disables all subsystems (the vacuum source 50, heater function 200, inlet valve control function 300, hydraulic pump function 400 and recirculation control function 500 are disabled). However, if at block 122 the low moisture setpoint is greater than the measured moisture level, then dehydration of the fluid is performed. In this regard, the heater function 200, inlet valve function 300, hydraulic pump function 400 and recirculation function 500 are executed. Execution of the functions 200, 300, 400 and 500 may be in parallel or sequential.

Moving back to block 102, if it is determined the system is in auto mode, then at block 108 a timer is initialized and started, and at block 110 the timer is monitored to determine if the timed value as kept by the timer exceeds a predetermined time interval. The predetermined time interval corresponds to the periodic interval at which the moisture level in the fluid is automatically checked.

As will be appreciated, the optimum value for the predetermined time interval may be application-specific. In one embodiment, the predetermined time interval is twenty-four hours. If the time interval has not elapsed (e.g., the timed value as kept by the timer is less than the predetermined interval), then the method loops at block 110. If the time interval has elapsed (e.g., the timed value as kept by the timer exceeds the predetermined interval), then the method moves to block 112 as discussed above (a sample of the fluid is obtained and checked for moisture content and a determination is made with respect to initiating a dehydration process).

Heater Function

The heater function 200 controls the heater 38 located in the vacuum chamber 36 so as to regulate a fluid temperature in the chamber 36 based on a desired temperature (a setpoint temperature) and an actual temperature of the fluid (e.g., as measured by the temperature sensor 42). Beginning at block 202, the temperature of the fluid is measured using, for example, temperature sensor 42. At block 204, the desired temperature setpoint for the fluid is obtained. The temperature setpoint may be a user-entered value (e.g., via a user interface), or it may be a fixed value stored in memory of the controller 68. As will be appreciated, the optimal temperature setpoint may be application-specific, and may vary from one system to another. In one embodiment, the temperature setpoint is 140 degrees F.

At block 206 the measured temperature of the fluid is compared to the temperature setpoint, and if the measured temperature is greater than the temperature setpoint heating of the fluid is not required. As a result, the method moves to block 208 where the heater is disabled and then the method moves back to the supervisory control function 100. However, if the measured temperature is less than the temperature setpoint, heating of the fluid is required. As a result, the method moves to block 210 where the heater is enabled and the method moves back to the supervisory control function 100.

Inlet Valve Function

The inlet valve function 300 controls the inlet valve 54 and thus the flow of fluid into the vacuum chamber 36. When the inlet valve 54 is in the open (enabled) state, fluid from the reservoir 12 is drawn into the vacuum chamber 36 due to the vacuum created by the vacuum source 50. When the inlet valve 54 is in the closed (disabled) state, the flow of fluid from the reservoir 12 to the vacuum chamber 36 is inhibited.

Beginning at block 301, a determination is made with respect to the operational mode of the system. Possible modes include fill mode, recirculation mode and empty mode. Fill mode transfers fluid from the reservoir 12 to the dehydration chamber 36, recirculation mode recirculates the fluid through the dehydration chamber 36 to dehydrate the fluid, and empty mode returns fluid from the chamber 36 and to the reservoir 12. If the system is in recirculation mode or empty mode, then the method moves to block 312 and the inlet valve is placed in the OFF state. However, if the system is not in recirculation mode or empty mode, then at block 302, the low fluid level status within the chamber 36 is checked using the low level sensor 48a. At block 304, if the fluid level is at the low level as determined from the sensor 48a, then the method moves to block 310 where the inlet valve 54 is opened. As a result, fluid is drawn into the vacuum chamber 36 from the reservoir 12 due to the vacuum created in the chamber 36 by the vacuum source 50.

Moving back to block 304, if the fluid level is not at the low level as determined from the low level sensor 34a, then at block 306 the high fluid level status within the chamber 36 is checked using the high level sensor 48b. At block 308, if the fluid level is not at the high level as determined from the high level sensor 48b, then the method moves to block 310 where the inlet valve 54 is opened and fluid is drawn from the reservoir 12 into the chamber 36 due to the vacuum in the chamber 36 as noted above. However, if at block 308 the fluid level is at the high fluid level as determined from the high level sensor 48b, then the method moves to block 312 where the inlet valve is closed, thereby inhibiting the flow of fluid from the reservoir 12 to the chamber 36. Both blocks 310 and 312 direct the method back to the supervisory control function 100.

Hydraulic Pump Function

The hydraulic pump function 400 controls the on/off state of the hydraulic pump 56. During dehydration of the fluid the hydraulic pump is used to recirculate the fluid through the chamber 36. Thus, when the hydraulic pump 56 is in the ON state (and the recirculation valve 67 is open—described below), fluid is recirculated through the vacuum chamber 36. When the hydraulic pump is in the OFF state, fluid is not recirculated through the chamber 36.

Beginning at block 402, the fluid level status within the chamber is obtained via the high level sensor 48b. At block 404, it is determined if the fluid level within the chamber 36 is or is not at the high level based on the high level sensor 48b. If the fluid level in the chamber is not at the high level, then the method moves to block 405 to determine if the system is in empty mode (i.e., returning the fluid to the reservoir). If the system is in empty mode, then the method moves to block 408 and the hydraulic pump 56 is enabled (i.e., placed in the ON state). However, if at block 405 the system is not in empty mode, then at block 406 the hydraulic pump 56 is disabled (i.e., placed in the OFF state). Moving back to block 404, if the fluid level is at the high level then the method moves to block 408 where the hydraulic pump 56 is enabled (i.e., placed in the ON state), thereby recirculating fluid through the chamber 36. Both blocks 406 and 408 direct the method back to the supervisory control function 100.

Recirculation Function

In dehydrating a fluid, fluid is recirculated through a dehydration device, such as dehydration device 40 of the vacuum chamber 36, to remove moisture from the fluid. Conventionally, recirculation of fluid through a dehydration device is controlled based on measurements obtained from a moisture detector, such as moisture detector 60. Moisture detectors, however, generally are slow devices that, depending on the process, can take significant time to obtain a reading.

For example, assume a particular type of fluid is 100% saturated at 300 ppm of water within the fluid, and also assume the particular fluid type is over-saturated, i.e., the fluid has more than 300 ppm of water. If the fluid is subjected to a dehydration process and as a result is no longer saturated (i.e., there is less than 300 ppm of water in the fluid), a moisture detector measuring the moisture in the fluid may indicate the fluid is still saturated. Such error is due to the slow response of the moisture detector. While the moisture detector will eventually indicate the fluid is no longer saturated, there can be a significant delay before the correct measurement is provided. Such delay by the moisture detector results in a performance penalty on the dehydration system. For example, use of a moisture detector can result in about 30% water removal rate loss. In addition, due to the slow response of the moisture detector the dehydration system may consume unnecessary power.

Dehydration of a fluid that is oversaturated follows a generally linear water removal rate. Dehydration of a fluid that is below saturation, however, is not linear. Moreover, water removal rate of a fluid that is below saturation is significantly less than the water removal rate when saturated/over-saturated.

In accordance with the present disclosure, instead of using a moisture detector to control the recirculation of fluid through a dehydration system, temperature of the fluid is used to control the recirculation of fluid. For example, and in the context of the exemplary system described herein, hydraulic pump 56 pumps the fluid through the filter 58, moisture detector 60 and into the vacuum chamber 36 via the inlet 34a. As the fluid enters the chamber 36 it is heated by the heater 38 (if necessary) and then passes through the dehydration device 40, which facilitates removal of moisture from the fluid. The fluid then exits the chamber 36 via outlet 34c wherein it returns to the pump 56 and continues to recirculate through the system until it is determined that the fluid can be returned back to the reservoir 12.

The temperature of the fluid, as opposed to the moisture level in the fluid, is used to control fluid recirculation. More specifically, fluid recirculation is enabled so long as a difference between the fluid temperature (which can be measured via temperature sensor 42) and a temperature setpoint (which can be set based on application needs) is greater than a predetermined temperature threshold. In one embodiment, the temperature setpoint is between 130 degrees F. and 150 degrees F., and the predetermined temperature threshold is between 3 degrees F. and 6 degrees F.

Upon the difference between the fluid temperature and the fluid temperature setpoint being less than the predetermined temperature threshold, a timer is started and fluid recirculation continues. Upon the timer expiring, recirculation is inhibited and dehydration of the batch is considered complete. The quicker response time of the temperature sensor along with the predetermined timer value (which may be determined empirically) provides a water removal rate that closely follows the moisture curve, thereby providing optical efficiency. Further details regarding an exemplary process for controlling the recirculation of the fluid are described with respect to FIG. 10.

Figure 10:
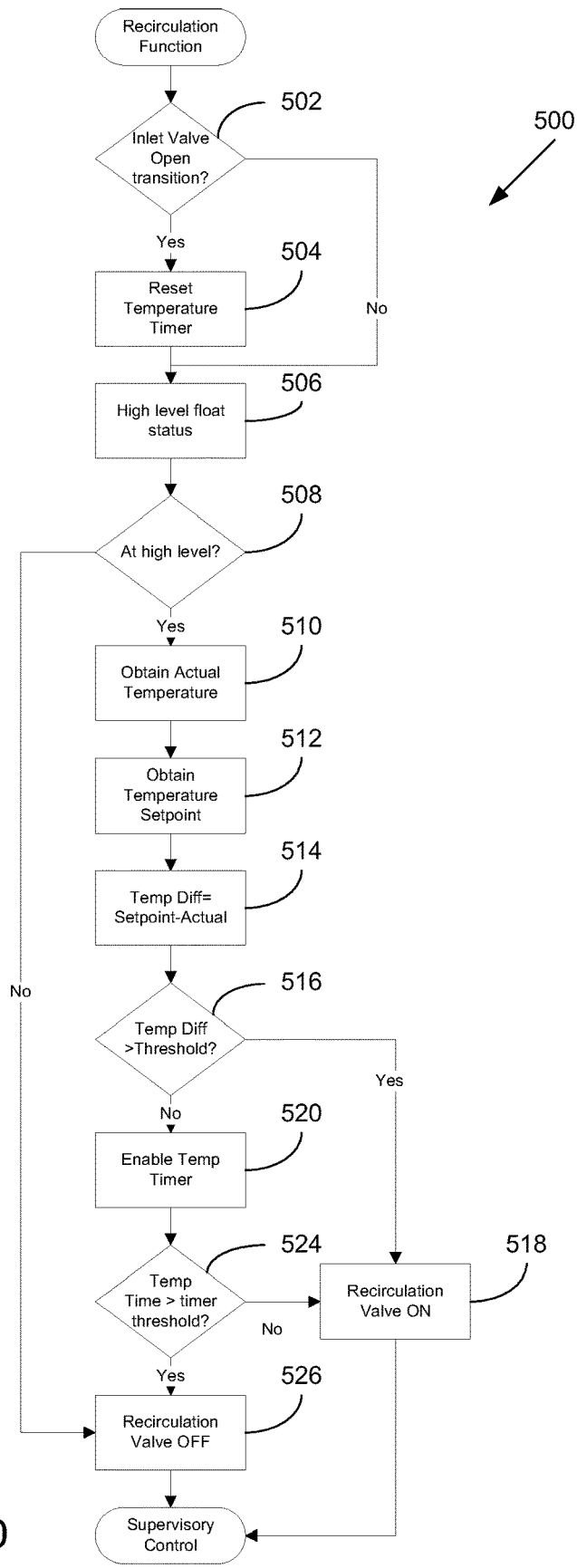
FIG. 10 is a flow chart illustrating fluid recirculation control for a dehydration system in accordance with the present disclosure.

Referring now to FIG. 10, logical steps for controlling recirculation of a fluid in a dehydration system are illustrated. Beginning at block 502, the state of the inlet valve 54, which provides fluid from the reservoir 12 to the chamber 36, is monitored. Upon the inlet valve transitioning from a closed position (i.e., inhibiting fluid flow into the chamber 36) to an open position (i.e., enabling flow), the method moves to block 504, resets a temperature timer and then proceeds to block 506. If the inlet vale is not transitioning from the closed state to the open state, then the method bypasses block 504 and proceeds to block 506.

At block 506 data corresponding to the fluid level within the chamber 36 is obtained. For example, the status of the high fluid level sensor 48b is read by the controller 68. At block 508, it is determined if the fluid level in the chamber 36 is at the high level (i.e., is the chamber considered full?). If the chamber is not full, then the system is not ready for recirculation and the method moves to block 526 where the recirculation valve 54 is disabled (i.e., closed so as to inhibit recirculation of fluid through the system), and then the method reverts back to the supervisory control function 100.

Moving back to block 508, if the chamber 36 is full, then the system is ready for recirculation and the method moves to block 520 where a temperature of the fluid in the chamber 36 is measured. The measurement can be made, for example, via temperature sensor 42 arranged in the chamber 36. Next at block 512 the temperature setpoint for the fluid in the chamber 36 is obtained. The temperature setpoint, for example, may be obtained via user input (e.g., via a user interface), or it may be a fixed value stored in memory of the controller 68.

At block 514, a temperature difference is calculated by subtracting the measured temperature from the temperature setpoint, and at block 516, the calculated temperature difference is compared to a predetermined temperature threshold. The temperature threshold used for the system may be application-specific. Preferably, the temperature threshold is between 3 and 6 degrees F. In one embodiment, the temperature threshold is 5 degrees F.

If the temperature difference is greater than the temperature threshold, then the method moves to block 518 where the recirculation valve is enabled (i.e., the valve is turned on to enable fluid to recirculate through chamber 36 via the inlet 34a and outlet 34c). The method then moves back to the supervisory control function 100.

If the temperature difference is not greater than the temperature threshold, then the method moves to block 520 and the timer is enabled. Next at block 524 the time value kept by the timer is compared to a timer threshold value. Like the temperature threshold value, the timer threshold value may be application-specific. An optimum value for the timer may be determined, for example, empirically. In one embodiment, the timer threshold value is between 1-3 minutes. If the time value as kept by the timer does not exceed the timer threshold value, then the method moves to block 518 and the recirculation valve is maintained in the on position as described above and fluid recirculates through the vacuum chamber 30. However, if the time value as kept by the timer is greater than the timer threshold value, then dehydration of the batch is considered complete, at block 526 the recirculation valve is closed thus inhibiting recirculation of the fluid through the vacuum chamber, and the method moves back to the supervisory control function 100.

By controlling the recirculation of fluid in the dehydration system based on temperature instead of moisture, system efficiency is significantly increased, which results in decreased operating costs.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:
1. A system for dehydrating a fluid, comprising:
a vacuum chamber including an inlet having an inlet valve for moving the fluid into the vacuum chamber, an outlet having a recirculation valve for recirculating the fluid through the vacuum chamber, and a temperature sensor for measuring a temperature of the fluid in the vacuum chamber, the controller operatively coupled to the inlet valve, the recirculation valve and the temperature sensor; and
a controller for controlling fluid flow through the vacuum chamber, the vacuum chamber having a temperature sensing device, the controller comprising:
logic configured to determine a temperature difference between a temperature setpoint for the fluid and a temperature of the fluid measured by the temperature sensing device;

logic configured to cause removal of moisture in the fluid by commanding the fluid to recirculate through the vacuum chamber while the temperature difference is greater than a predetermined temperature difference;

logic configured to command a timer to begin timing when the temperature difference is less than the predetermined temperature difference; and logic configured to cause removal of moisture in the fluid by commanding the fluid to recirculate through the vacuum chamber while a time value kept by the timer is less than a predetermined time period, and logic configured to inhibit recirculation of the fluid through the vacuum chamber when the time value kept by the timer is greater than the predetermined time period.

2. The system according to claim 1, wherein the inlet valve has a first state that inhibits fluid flow from a fluid reservoir into the vacuum chamber and a second state that enables fluid flow from the fluid reservoir into the vacuum chamber, the controller further comprising:

an input for receiving the first state or the second state of the inlet valve; and logic configured to initialize a timer upon the inlet valve transitioning from the first state to the second state, the timer operative to keep time of the interval in which the fluid is recirculated through the vacuum chamber while the temperature difference is less than the predetermined temperature difference.

3. The system according to claim 1, further comprising:

logic configured to automatically monitor, at predetermined intervals, a moisture level of a sample of the fluid; and logic configured to automatically initiate, upon the moisture level exceeding a predetermined moisture level, dehydration of the fluid.

4. The system according to claim 3, wherein the logic configured to automatically monitor the moisture level comprises:

logic configured to cause a vacuum to be applied to the chamber to draw fluid into the chamber; and logic configured to measure the moisture level of the fluid drawn into the chamber.

5. The system according to claim 1, further comprising:

logic configured to determine a fluid level within the vacuum chamber; and logic configured to inhibit recirculation of fluid through the vacuum chamber when the fluid level in the vacuum chamber is below a predetermined fluid level.

6. The system according to claim 1, wherein the recirculation valve arranged between the fluid inlet of the vacuum chamber and a fluid outlet of the vacuum chamber, the recirculation valve having a first state that inhibits recirculation of the fluid through the vacuum chamber, and a second state that enables recirculation of the fluid through the vacuum chamber, wherein the logic configured to command the fluid to recirculate includes logic that places the recirculation valve in the second state.

7. The system according to claim 6, wherein the logic that inhibits recirculation includes logic that places the recirculation valve in the first state.

8. The system according to claim 1, further comprising:

a dehydration device arranged in the vacuum chamber and operative to facilitate dehydration of the fluid; and a heater arranged in the vacuum chamber, the heater operative to heat the fluid to a predetermined temperature.

9. The system according to claim 8, further comprising a moisture sensor operative to detect a moisture level of fluid entering the inlet.

10. The system according to claim 1, further comprising a fluid level sensor assembly configured to determine a maximum fluid level and a minimum fluid level in the vacuum chamber.

11. The system according to claim 1, further comprising a fluid pump operative to recirculate the fluid between the inlet and the outlet.

12. A method of controlling fluid flow through a vacuum chamber of a dehydration system, the vacuum chamber having a temperature sensing device operative to measure a temperature of a fluid in the vacuum chamber, the method comprising:

determining a temperature difference between a temperature setpoint for the fluid and a temperature of the fluid measured by the temperature sensing device;

removing moisture from the fluid by recirculating fluid through the vacuum chamber while the temperature difference is greater than a predetermined temperature difference; and while the temperature difference is less than the predetermined temperature difference, removing moisture from the fluid by recirculating the fluid through the vacuum chamber for a predetermined time period, and upon the predetermined time period expiring inhibiting recirculation of the fluid through the vacuum chamber.

13. The method according to claim 12, wherein the system includes an inlet valve having a first state that inhibits fluid flow from a fluid reservoir into the vacuum chamber and a second state that enables fluid flow from the fluid reservoir into the vacuum chamber, the method further comprising initializing a timer upon the inlet valve transitioning from the first state to the second state, the timer keeping time of the interval in which the fluid is recirculated through the vacuum chamber while the temperature difference is less than the predetermined temperature difference.

14. The method according to claim 13, wherein automatically monitoring the moisture level comprises:

applying a vacuum to the chamber to draw fluid into the chamber; and measuring the moisture level of the fluid drawn into the chamber.

15. The method according to claim 14, wherein measuring the moisture level comprises using a moisture detector to measure the moisture level in the fluid.

16. The method according to claim 12, further comprising:

at predetermined intervals, automatically monitoring a moisture level of a sample of the fluid; and upon the moisture level exceeding a predetermined moisture level, automatically initiating dehydration of the fluid.

17. The method according to claim 12, further comprising determining a fluid level within the vacuum chamber, and disabling recirculation of fluid through the vacuum chamber when the fluid level in the vacuum chamber is below a predetermined fluid level.

18. The method according to claim 12, wherein the dehydration system includes a recirculation valve arranged between a fluid inlet of the vacuum chamber and a fluid outlet of the vacuum chamber, the recirculation valve having a first state that inhibits recirculation of the fluid through the vacuum chamber, and a second state that enables recirculation of the fluid through the vacuum chamber, wherein recirculating the fluid includes placing the recirculation valve in the second state.

19. The method according to claim 18, wherein inhibiting recirculation includes placing the recirculation valve in the first state.

\* \* \* \* \*